US006781280B2

(12) United States Patent
 Ando

(10) Patent No.: US 6,781,280 B2
(45) Date of Patent: Aug. 24, 2004

(54) SLIDER DISPLACEMENT DIRECTION CONVERSION MECHANISM IN ELECTROSTATIC ACTUATOR

(75) Inventor: Yasuhisa Ando, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 116 days.

(21) Appl. No.: 09/970,939

(22) Filed: Oct. 5, 2001

(65) Prior Publication Data

US 2002/0050763 A1 May 2, 2002

(30) Foreign Application Priority Data

Oct. 5, 2000 (JP) ........................................ 2000-306445

(51) Int. Cl.⁷ ................................................ H02N 1/00
(52) U.S. Cl. ..................................................... 310/309
(58) Field of Search ........................... 310/309, 20, 37, 310/40 MM; 385/13, 18; 359/223, 224, 291, 292, 872

(56) References Cited

U.S. PATENT DOCUMENTS

| 5,434,464 | A | | 7/1995 | Bobbio et al. .............. 310/309 |
| 5,862,003 | A | * | 1/1999 | Saif et al. ................... 359/871 |
| 6,545,385 | B2 | * | 4/2003 | Miller et al. ................ 310/309 |

FOREIGN PATENT DOCUMENTS

| EP | 1195887 | * | 10/2002 | ............ H02N/1/00 |
| JP | 05-116757 | * | 5/1993 | ............ B65G/54/02 |
| JP | 2002-119072 | * | 4/2002 | ............ H02N/1/00 |

OTHER PUBLICATIONS

Fan et al., "Self Assembled Microactuated XYZ Stages for Optical Scanning and Alignment;", Jun. 1997, International Conference on Solid State Sensors and Actuators, pp. 319–322.*
T. Yasuda, et al., IEEE/RSJ International Conference on Intelligent Robots and Systems, vol. 2, XP–000697570, pp. 242–245, "Electrostatically Driven Micro Elastic Joints", Aug. 5, 1995.

* cited by examiner

Primary Examiner—Karl Tamai
(74) Attorney, Agent, or Firm—Oblon, Spivak, McClelland, Maier & Neustadt, P.C.

(57) ABSTRACT

There is provided a slider displacement direction conversion mechanism in an electrostatic actuator which can convert the displacement direction of a slider in the perpendicular direction to a substrate surface, the mechanism comprises a slider which is displaced under the force from the electrostatic actuator generating the electrostatic force parallel to the substrate surface, and a plurality of elastic beams fixed to a substrate which supports the slider, the elastic beams are entirely or locally provided with displaceable members supporting the slider, and the displaceable member is easily displaced in the direction different from the displacement direction when the slider is subjected to the force in the displacement direction.

7 Claims, 5 Drawing Sheets

SLIDER DISPLACEMENT DIRECTION CONVERSION MECHANISM IN ELECTROSTATIC ACTUATOR

TECHNICAL FIELD OF THE INVENTION

The present invention relates to a mechanism of converting the displacement direction of a slider driven by an electrostatic actuator in a structure which is manufactured on a surface of a substrate formed of silicon or the like by using a technology such as photolithography.

DESCRIPTION OF THE RELATED ART

Hitherto, a slider (a shuttle) 52 has been displaced by using an interdigital electrostatic actuator 50 as shown in FIG. 6 in order to continuously control the displacement in a structure manufactured on the surface of a substrate formed of silicon or the like by using a technology such as photolithography.

The electrostatic actuator 50 comprises a fixed side interdigital electrode 54 and a movable side interdigital electrode 55, the movable side interdigital electrode 55 is mounted on a fitting portion 53 at an end of the slider 52, and the slider 52 is displaced in a direction parallel to a substrate surface 51 by generating the electrostatic force between the interdigital electrodes 54, 55.

In addition, in order to displace the slider in the perpendicular direction, a method of generating the electric field E perpendicular to the substrate surface 51 has been employed as shown in FIG. 7.

However, in a method using the conventional interdigital electrostatic actuator 50 or the like as shown in FIG. 6, the motion thereof is limited only in the horizontal direction with respect to the substrate surface 51 though the displacement can be continuously controlled, and no means which realizes the motion in the perpendicular direction with respect to the substrate surface 51 has been available.

Further, in a method of generating the electric field perpendicular to the substrate surface 51 as shown in FIG. 7, the displacement is small, and the continuous control is less easily implemented, and the slider cannot be displaced in a separating direction from the substrate surface.

SUMMARY OF THE INVENTION

The present invention has been made in light of the above problems, and a technical object is to provide a slider displacement direction conversion mechanism in the electrostatic actuator in which the displacement direction of the slider can be converted in the perpendicular direction with respect to the substrate surface.

Another technical object of the present invention is to provide a slider displacement direction conversion mechanism in the electrostatic actuator in which the displacement of the slider in the parallel direction with respect to the substrate surface is canceled, and the displacement in the upwardly perpendicular direction with respect to the substrate surface is increased.

In order to solve the above problems, the slider displacement direction conversion mechanism in the electrostatic actuator comprises at least one electrostatic actuator which generates the electrostatic force parallel to the substrate surface, at least one slider which is displaced under the force from the electrostatic actuator, and at least one elastic beam fixed to the substrate supporting the slider, the elastic beam has displaceable members which entirely or locally support the slider, and the displaceable members are characterized in that they are easily displaced in a direction different from the displacement direction when the slider is subjected to the force in the displacement direction.

The slider displacement direction conversion mechanism in the electrostatic actuator has preferably a leaf spring structure in which one end of the elastic beam is fixed to the substrate in an inclined manner to the substrate surface, and the other end thereof is fixed to the slider, the entire elastic beam is suitable for the displaceable members, the elastic beam has a strip-like projecting piece which is inclined to the substrate surface on both ends thereof, the strip-like projecting pieces on both ends form the displaceable member, and the elastic beam is fixed to the substrate via the other strip-like projecting piece.

Preferably, in the slider displacement direction conversion mechanism in the electrostatic actuator, the strip-like projecting piece is suitably formed by providing a notched portion in a part of the elastic beam, the displaceable member of the elastic beam is disposed so as to be easily displaced on a predetermined direction, and a plurality of elastic beams having the displaceable member are disposed so that each displaceable member is easily displaced in the same direction.

Preferably, in the slider displacement direction conversion mechanism in the electrostatic actuator, the displaceable member of the elastic beam is disposed so as to be easily displaced in a predetermined direction, a plurality of elastic beams having the displaceable members are disposed so as to support forward and rear portions of the slider, the forward and rear elastic beams are suitably disposed so that each displaceable member thereof is easily displaced in different directions, the slider comprises first and second sliders disposed parallel to each other, the first slider is supported by the substrate via the displaceable member of the elastic beam fixed to the substrate, the second slider is supported by the first slider via the displaceable member of the elastic beam, and driving forces in the reverse direction to each other are given from first and second electrostatic actuators to the first and second sliders so that the displacement in the direction parallel to the substrate surface of the second slider is canceled, and the displacement in the upwardly perpendicular direction with respect to the substrate surface is increased.

Preferably, in the slider displacement direction conversion mechanism in the electrostatic actuator, two of the first sliders are supported in parallel by the substrate via the displaceable member of the outer elastic beam fixed to the substrate, one of the second sliders is disposed between the two first sliders, the second slider is respectively supported by the two first sliders via the displaceable member of the inner elastic beam, the displaceable member of the outer elastic beam is a plate-like displaceable member inclined at a counterclockwise angle with respect to the substrate while the displaceable member of the inner elastic beam is a plate-like displaceable member inclined at a clockwise angle from the substrate.

When the electrostatic actuator generates the electrostatic force, the elastic beam supporting the sliders is subjected to the force to generate the displacement parallel to the substrate.

Since the displaceable members of the elastic beam supporting the slider are easily displaced in the direction different from the force applying direction, the displaceable members of the elastic beam are displaced by a specific angle with respect to the direction of the force.

As a result, the slider supported by the displaceable member of the elastic beam is displaced so as to have a component of the motion in the perpendicular direction with respect to the substrate.

DESCRIPTION OF THE EMBODIMENTS

The embodiments of a slider displacement direction conversion mechanism in an electrostatic actuator of the present invention will be described below with reference to the drawings.

Figure 1A:
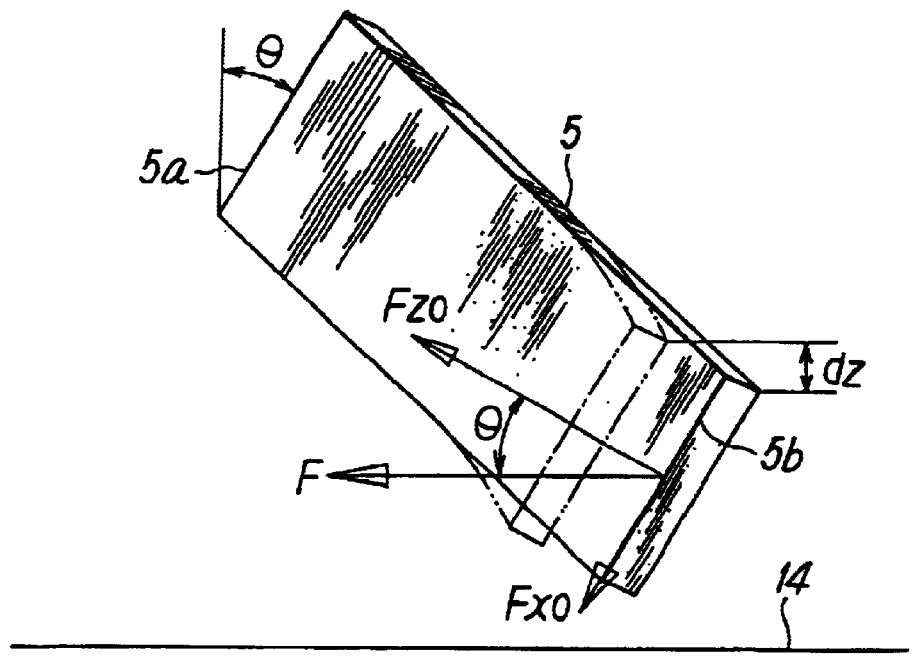
FIG. 1a is a partly perspective view showing an enlarged portion A in FIG. 1b in order to indicate the principle of the action of the present invention.
Figure 1B:
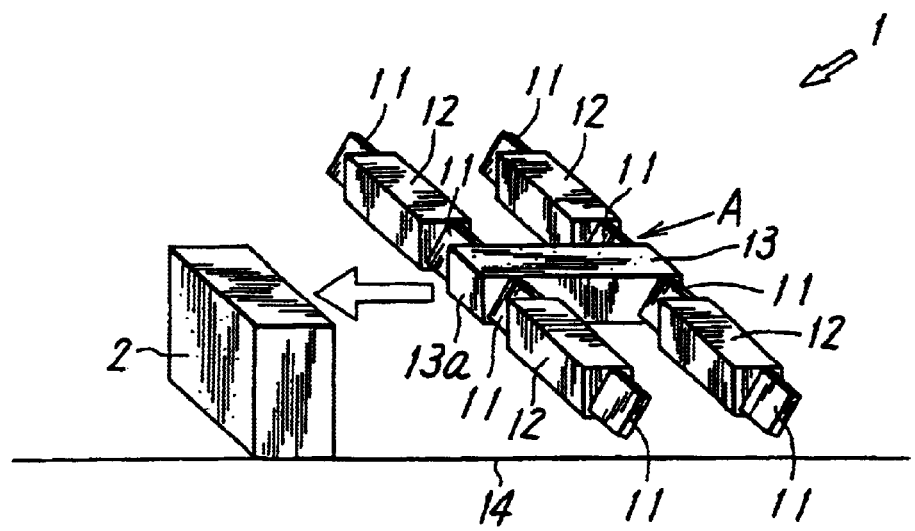
FIG. 1b is a perspective view showing an embodiment of a slider displacement direction conversion mechanism in an electrostatic actuator of the present invention.
Figure 2:
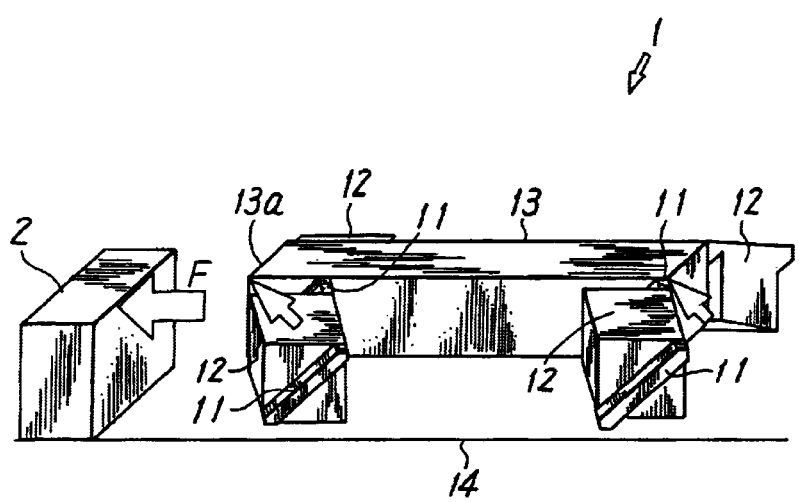
FIG. 2 is a perspective view showing a similar embodiment to that in FIG. 1b.

A slider displacement direction conversion mechanism 1 according to the embodiment of the present invention comprises two pairs of elastic beams 12 having two displaceable members 11 on both end faces thereof with an appropriate space therebetween as shown in FIG. 1b or FIG. 2, and a slider 13 is disposed so as to be located on a tip of one displaceable member 11 of each elastic beam 12. The number of the elastic beams may be arbitrarily determined but at least three.

The displaceable members 11 comprise a strip-like projecting piece disposed on both end faces of the elastic beam 12 in the same direction inclined at a counterclockwise angle with respect to a substrate 14 in the figure. The strip-like projecting piece forming the displaceable members 11 is a member which is easily displaced in a direction different from the displacement direction when the slider is subjected to the force in the displacement direction, and the strip-like projecting piece is formed by providing a notched portion in a part of the elastic beam 12.

Figure 6:
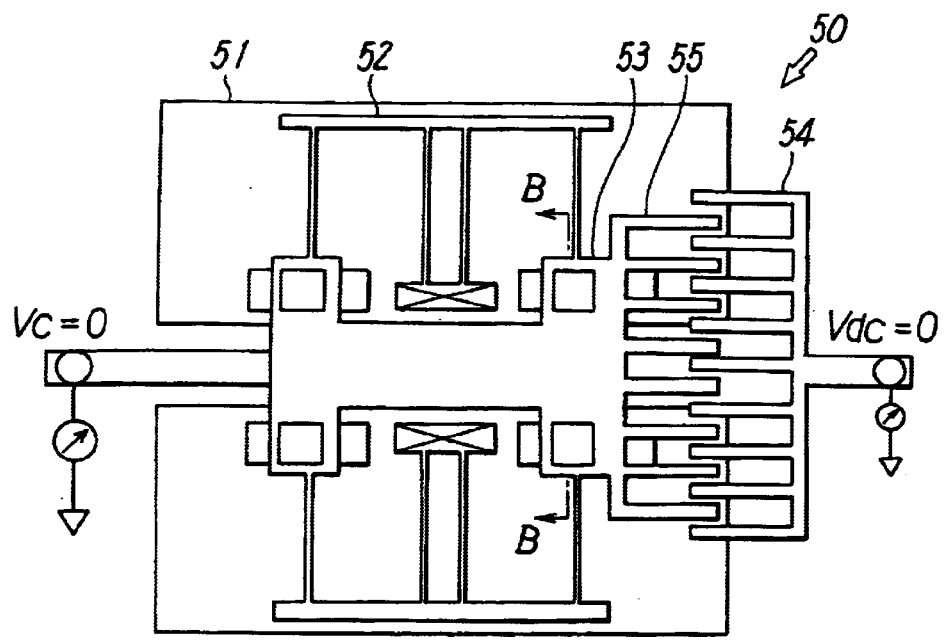
FIG. 6 is a plan view showing a conventional interdigital electrostatic actuator.
Figure 7:
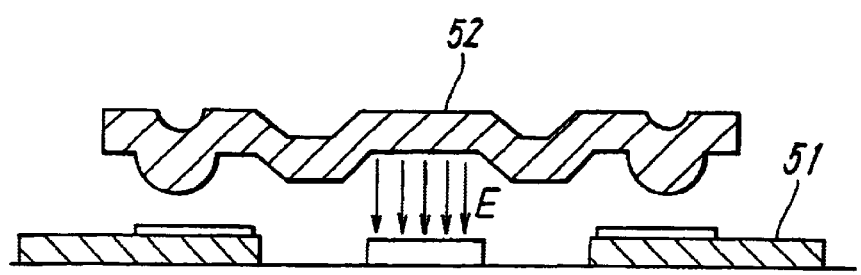
FIG. 7 is a cross-sectional view through the line B—B in FIG. 6.

One electrostatic actuator 2 which generates the electrostatic force parallel to a substrate surface is disposed on the substrate 14, the electrostatic actuator 2 comprises a fixed side interdigital electrode and a movable side interdigital electrode similar to those in FIG. 6, the movable side interdigital electrode is mounted on a fitting portion 13a at an end of the slider 13, and the slider 13 is displaced in the horizontal direction with respect to the surface of the substrate 14 by generating the electrostatic force between the fixed side interdigital electrode and the movable side interdigital electrode.

The electrostatic actuator 2, the slider 13 and the elastic beam 12 are manufactured by using the technology such as photolithography.

The displaceable members 11 of the elastic beam 12 are inclined to the surface of the substrate 14 as described above, one of the displaceable members 11 is fixed to the slider 13, and the other of the displaceable members 11 is fixed to a fixed portion (not shown in the figure) which is integratedly formed on the substrate 14 in the horizontal direction.

The displaceable member 11 is shown as a leaf spring 5 in FIG. 1a, and a fixed end 5a thereof is fixed to the substrate 14 in an inclined manner by the fitting angle q with respect to the normal direction of the substrate 14, and a tip 5b thereof is fixed to the slider 13 or the elastic beam.

Since the slider 13 is subjected to the electrostatic force F parallel to the surface of the substrate 14 by the electrostatic actuator 2, the electrostatic force F is applied to the tip 5b as shown in FIG. 1a.

The electrostatic force F generates the force component $F_{x0}$ in the width direction of the leaf spring 5 and the force component $F_{z0}$ in the thickness direction orthogonal to the width direction of the leaf spring 5. However, the leaf spring 5 has a high rigidity in the force direction of $F_{x0}$, and has a relatively low rigidity in the force direction of $F_{z0}$, and the leaf spring is little displaced in the force direction of $F_{x0}$, but mainly displaced in the force direction of $F_{z0}$.

As a result, the displacement dz in the perpendicular direction is generated at the tip 5b of the leaf spring 5 with respect to the surface of the substrate 14.

As described above, the displaceable member 11 comprises the strip-like projecting piece disposed on both end faces of the elastic beam 12 in the same direction with a counterclockwise angle of inclination with respect to the surface of the substrate 14, the slider 13 is fixed to the tip of one displaceable member 11, and the other displaceable member 11 is fixed to the substrate 14, and as shown in FIG. 2, when the slider 13 is subjected to the electrostatic force F in the left direction parallel to the surface of the substrate 14, the displaceable members 11 disposed on a plurality of elastic beams 12 are displaced in the same direction, and as a result, the slider 13 is displaced upward to the left while constantly maintaining the same angle of inclination with respect to the substrate 14, and the distance from the substrate 14 is increased, accordingly.

Figure 3:
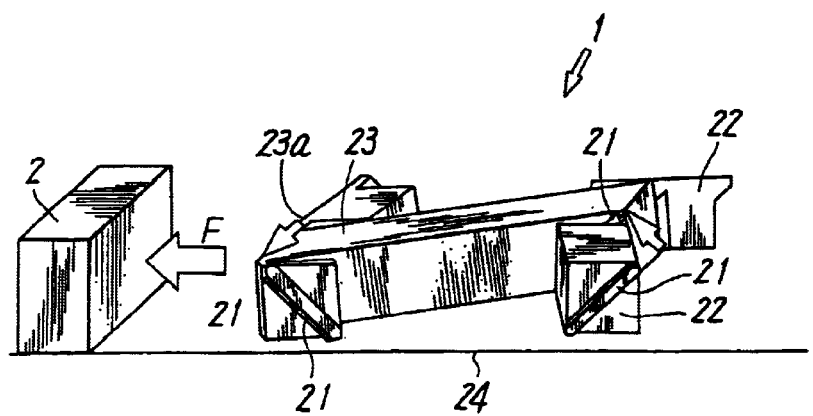
FIG. 3 is a perspective view showing another embodiment of the slider displacement direction conversion mechanism in the electrostatic actuator of the present invention.

FIG. 3 shows another embodiment of the slider displacement direction conversion mechanism in the electrostatic actuator of the present invention.

In the embodiment in FIG. 3, two pairs of elastic beams 22 having two displaceable members 21 on both end faces are disposed with a suitable space therebetween, and a slider 23 is disposed so as to be located on a tip of one displaceable member 21 of each elastic beam 22.

The displaceable members 21 comprise strip-like projecting piece disposed on both end faces of the elastic beam 22 at different angles from each other with respect to the substrate 24.

This means that, in FIG. 3, the displaceable member 21 on the right elastic beam is inclined at a counterclockwise angle with respect to the substrate with respect to the substrate 24, while the displaceable member 21 on the left elastic beam is inclined at a clockwise angle with respect to the substrate 24.

An electrostatic actuator 2, the slider 28 and the elastic beam 21 are disposed on the substrate 24 by using the technology such as photolithography, the slider 23 has a fitting portion 23a with a movable side interdigital electrode mounted on an end thereof, and the electrostatic actuator 2 generates the electrostatic force between the fixed side interdigital electrode and the movable side interdigital electrode, and displaces the slider 23 in the horizontal direction with respect to the surface of the substrate 24.

When the slider 23 is subjected to the electrostatic force F in the left direction parallel to the surface of the substrate 24, the displaceable members 21 disposed on the plurality of elastic beams 22 are displaced in different directions, and as a result, the slider 23 is inclined at a counterclockwise angle with respect to the substrate 24, and the distance from the substrate 24 is changed thereby.

Figure 4:
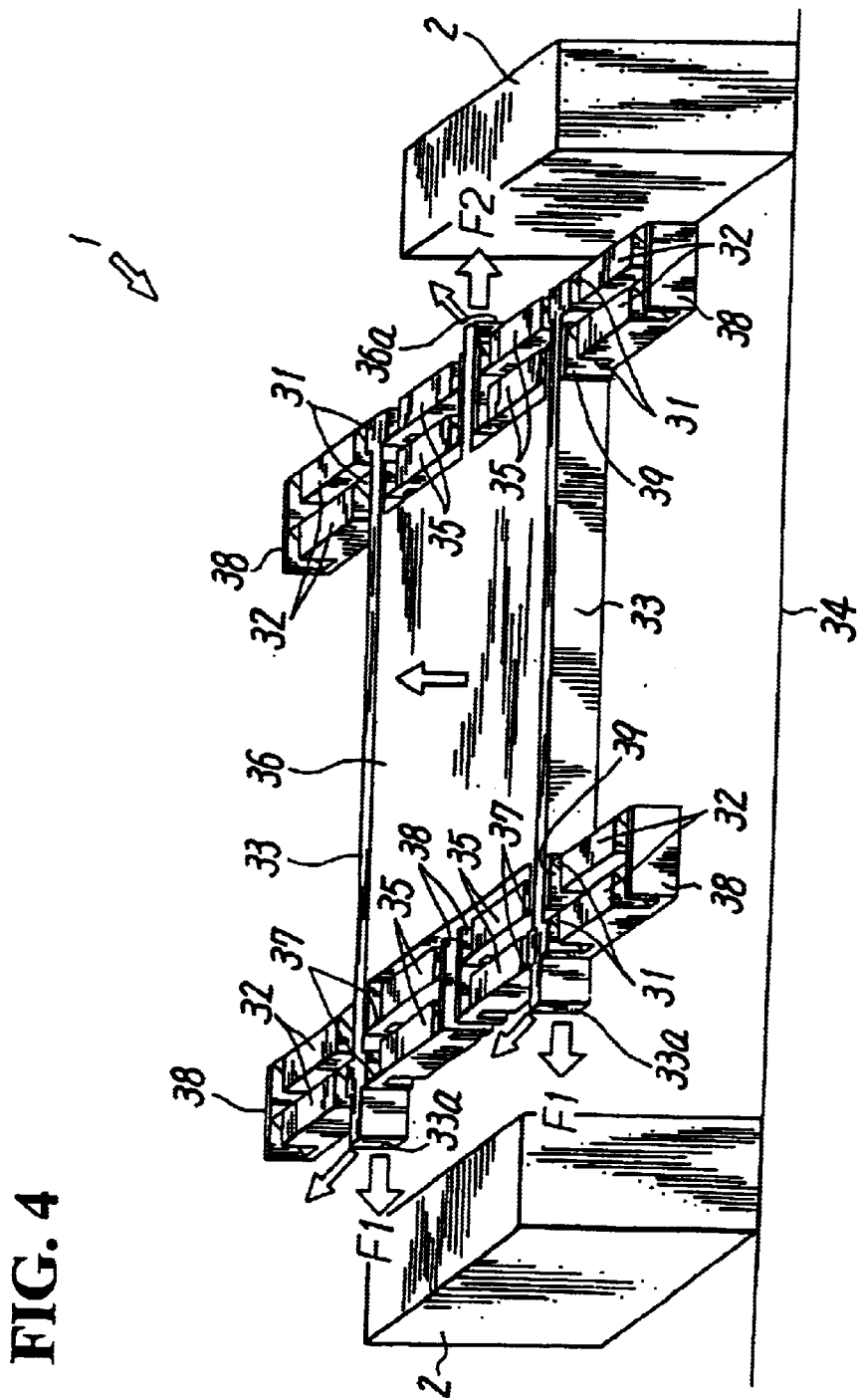
FIG. 4 is a perspective view similarly showing another embodiment.

FIG. 4 shows still another embodiment of the slider displacement direction conversion mechanism in the electrostatic actuator of the present invention.

In the embodiment shown in FIG. 4, the slider displacement direction conversion mechanism 1 in the electrostatic actuator comprises two outer sliders 33 disposed on a substrate 34 parallel to each other, one inner slider 36 disposed between the two outer sliders 33, total four sets of outer elastic beams 32 with each set thereof comprising one pair of the outer elastic beams supporting the two outer sliders 33, total four sets of inner elastic beams 35 with each set thereof comprising one pair of inner elastic beams supported by the outer sliders 33, total four fixed portions 39 integratedly disposed on the substrate 34 in the perpendicular direction in the vicinity of side walls of the outer sliders 33, and two electrostatic actuators 2 disposed on the substrate 34 facing both sides in the axial direction of the outer sliders 33 and the inner slider 36.

The electrostatic actuators 2, the outer sliders 33, the inner slider 36, the outer elastic beams 32, the inner elastic beams 35, and the fixed portions 39 are disposed on the substrate 34 by using the technology such as photolithography, the outer sliders 33 and the inner slider 36 have fitting portions 33a, 36a with a movable interdigital electrode mounted on ends thereof, and the electrostatic actuators 2 generate the electrostatic force between the fixed side interdigital electrode and the movable side interdigital electrode, and displace the outer sliders 33 and the inner slider 36 in the horizontal direction with respect to the surface of the substrate 34.

The outer sliders 33, the inner slider 36, the outer elastic beams 32, the inner elastic beams 35 and the fixed portions 37 are symmetrical to the axis in the axial direction.

The pair of outer elastic beams 32 are disposed parallel to each other, and the displaceable members 31 which are formed of the strip-like projecting pieces similar to those shown in FIG. 2 and inclined at a counterclockwise angle with respect to the substrate 34 are disposed on both end faces of the outer elastic beams 32.

Side walls of the outer sliders 33 are fixed to one elastic beam 32 of the pair of outer elastic beams 32 via the displaceable members 31, the other elastic beam 32 of the pair of outer elastic beams 32 is fixed to the fixed portions 39 via the displaceable members 31, and the displaceable members 31 on the end face on the opposite side to the pair of outer elastic beams 32 are respectively fixed to connection plates 38.

Thus, the outer sliders 33 are supported by the substrate 34 via one elastic beam 32 of the pair of outer elastic beams 32, the connection plates 38, the other elastic beam 32 of the pair of outer elastic beams 32, and the fixed portions 39.

The pair of inner elastic beams 35 are disposed parallel to each other, and the displaceable members 37 which are symmetrical to the displaceable members 31 disposed on both end faces of the outer elastic beams 32, formed of the strip-like projecting pieces and inclined at a clockwise angle with respect to the substrate 34 are respectively formed on both side surfaces of the inner elastic beams 35.

One elastic beam 35 of the pair of inner elastic beams 35 is fixed to an inner side wall of the outer slider 33 via the displaceable member 37 thereof, the other elastic beam 85 of the pair of inner elastic beams 35 is fixed to the inner slider 36 via the displaceable member 37 thereof, and the displaceable members 37 on the end face on the opposite side of the pair of inner elastic beams 35 are fixed to the connection plates 38, respectively.

Therefore, the inner slider 36 is supported by the outer sliders 33 via the other elastic beam 35 of the pair of inner elastic beams 35, the connection plates 38, and one elastic beam 35 of the pair of inner elastic beams 35.

In the embodiment shown in FIG. 4, the displaceable members 31 which are formed of the strip-like projecting pieces and inclined at a counterclockwise angle with respect to the substrate 34 are formed on the outer elastic beams 32 which support the outer sliders 33 and are supported by the substrate 34, the displaceable members 37 which are formed of the strip-like projecting pieces and inclined at a clockwise angle with respect to the substrate 34 are formed on the inner elastic beams 35 which support the inner slider 36 and are supported by the outer sliders 33. Thus, when the electrostatic force F1 in the left direction is applied to the outer sliders 33 by one electrostatic actuator 2, the outer sliders 33 and the inner slider 36 supported thereby are displaced upward to the left, and when the electrostatic force F2 in the right direction is applied to the inner slider 36 by the other electrostatic actuator 2, the inner slider 36 is displaced upward to the right.

Thus, when the two electrostatic actuator 2 are simultaneously operated, the displacement in the left horizontal direction of the outer sliders 33 is canceled by the displacement in the right horizontal direction of the inner slider 36, and as a result, the inner slider 36 is displaced by the doubled displacement upwardly in the perpendicular direction.

Figure 5:
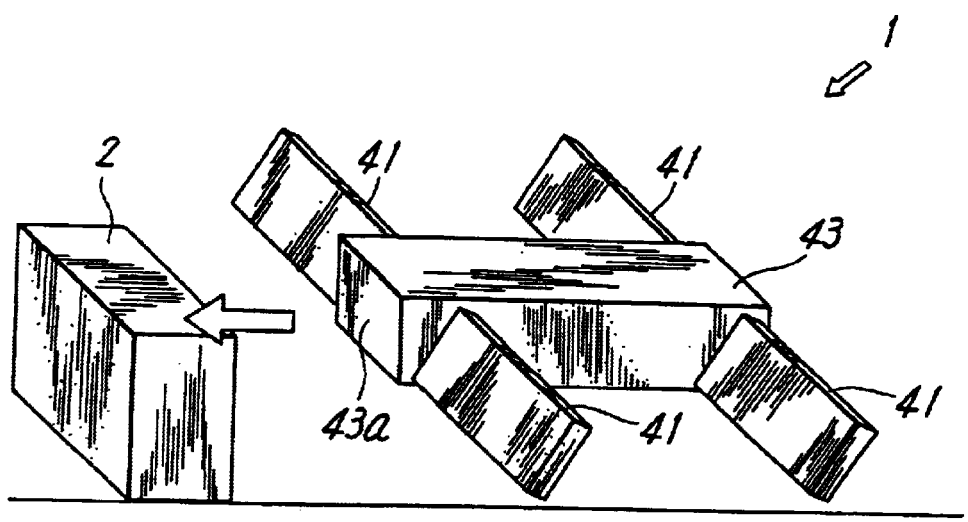
FIG. 5 is a perspective view similarly showing another embodiment.

FIG. 5 shows further another embodiment of the slider displacement direction conversion mechanism in the electrostatic actuator of the present invention.

The embodiment shown in FIG. 5 has basically the same structure as that of the embodiment shown in FIG. 2, except that an entire elastic beam 41 forms a displaceable member.

The elastic beams 41 according to the embodiment shown in FIG. 5 have a leaf spring structure in which one end thereof is fixed to a substrate 44 in an inclined manner with respect to the substrate surface thereof, and the other end thereof is fixed to the slider 43, and the entire elastic beams 41 form the displaceable members.

The slider 43 has a fitting portion 43a with a movable side interdigital electrode mounted on an end thereof, and the slider 43 is displaced in the horizontal direction with respect to the surface of the substrate 44 by generating the electrostatic force between the fixed side interdigital electrode and the movable side interdigital electrode of the electrostatic actuator 2.

The present invention is described above with reference to the embodiments, however, the present invention is not limited to these embodiments, and the embodiments can be arbitrarily modified within the scope of the present invention.

What is claimed is:

1. A slider displacement direction conversion mechanism in an electrostatic actuator comprising at least one electrostatic actuator which generates the electrostatic force parallel to a substrate surface, at least one slider which is displaced under the force from said electrostatic actuator, and at least one elastic beam fixed to the substrate supporting said slider, wherein said elastic beam has a displaceable member which entirely or locally supports said slider, wherein said displaceable member is easily displaced in a direction different from a displacement direction when said slider is subjected to the force in said displacement direction, and wherein said elastic beam has a leaf spring structure in which one end of said elastic beam is fixed to said substrate in an inclined manner to the substrate surface, and the other end thereof is fixed to said slider, the entire elastic beam forms said displaceable member.

2. A slider displacement direction conversion mechanism in an electrostatic actuator, comprising at least one electrostatic actuator which generates the electrostatic force parallel to a substrate surface, at least one slider which is displaced under the force from said electrostatic actuator, and at least one elastic beam fixed to the substrate supporting said slider, wherein said elastic beam has a displaceable member which entirely or locally supports said slider, wherein said displaceable member is easily displaced in a direction different from a displacement direction when said slider is subjected to the force in said displacement direction, wherein said elastic beam has a strip-like projecting piece which is inclined to said substrate surface on both ends thereof, and wherein said strip-like projecting pieces on both ends form said displaceable members, and said elastic beam is fixed to said substrate via said strip-like projecting piece.

3. A slider displacement direction conversion mechanism in an electrostatic actuator according to claim 2, wherein said strip-like projecting piece is formed by providing a notched portion in a part of said elastic beam.

4. A slider displacement direction conversion mechanism in electrostatic actuator according to any one of claims 1 to 2, wherein displaceable members of said elastic beam are disposed so as to be easily displaced in a predetermined direction, and a plurality of elastic beams having said displaceable members are disposed so that each displaceable member is easily displaced in the same direction.

5. A slider displacement direction conversion mechanism in an electrostatic actuator according to any one of claims 1 to 2, wherein displaceable members of said elastic beams are disposed so as to be easily displaced in a predetermined direction, the elastic beams having said displaceable members are disposed so as to support forward and rear portions of said slider, and said forward and rear elastic beams are disposed so that each displaceable member is easily displaced in different directions.

6. A slider displacement direction conversion mechanism in electrostatic actuator according to any one of claims 1 to 2, wherein said at least one slider comprises two outer sliders disposed parallel to the substrate and one inner slider disposed between and parallel to the two outer sliders, said two outer sliders are supported by outer elastic beams via the displaceable member the outer elastic beams having the displaceable member is fixed to the substrate and disposed outside the outer sliders, the inner slider placed between the outer sliders is supported by the outer sliders via inner elastic beams having the displaceable member, and wherein driving forces in the reverse direction to each other are given from first and second electrostatic actuators to the two outer sliders and the inner slider so that the displacement in the direction parallel to the substrate surface of said inner slider is canceled, and the displacement in the upwardly perpendicular direction with respect to the substrate surface is increased.

7. A slider displacement direction conversion mechanism in an electrostatic actuator according to claim 6, wherein the outer sliders, the inner slider, the outer elastic beams and the inner elastic beams are symmetrical to an axis in an axial direction, said inner elastic beams have the displaceable members on an opposite side, wherein one end of a pair of parallel disposed outer elastic beams is fixed to a connection plate via the displaceable member to connect the outer elastic beams to each other, one end of a pair of inner elastic beams is fixed to an inner wall of the outer slider via the displaceable member, another end of another pair of inner elastic beams is fixed to the inner slider via the displaceable member, wherein the displaceable member of said outer elastic beam is a plate-like displaceable member inclined at a counterclockwise angle with respect to the substrate, and wherein the displaceable member of said inner elastic beam is a plate-like displaceable member inclined at a clockwise angle with respect to the substrate.

\* \* \* \* \*